No. 789,705. PATENTED MAY 16, 1905.
J. G. B. ASTENIUS.
STOP ACTION FOR ORGANS.
APPLICATION FILED MAR. 4, 1904.
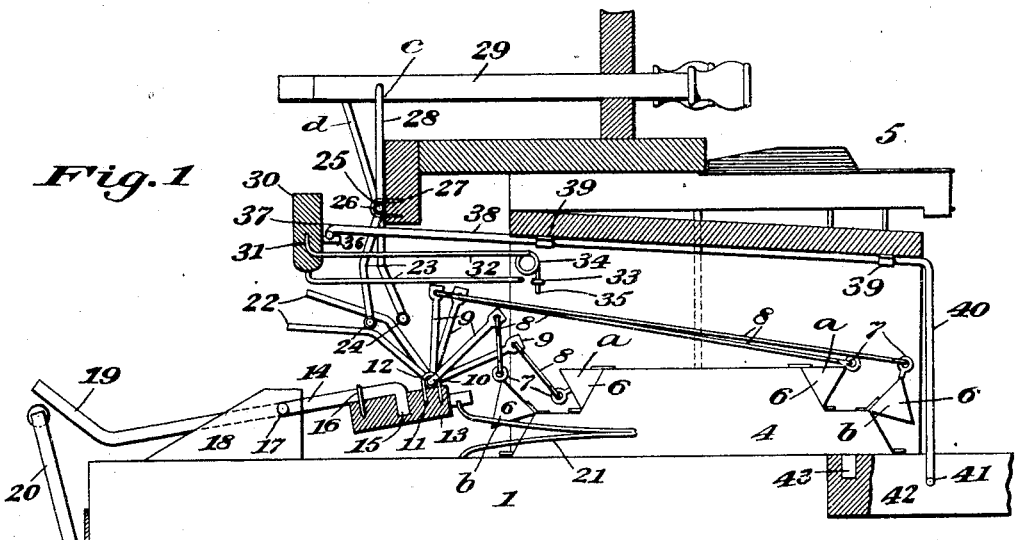
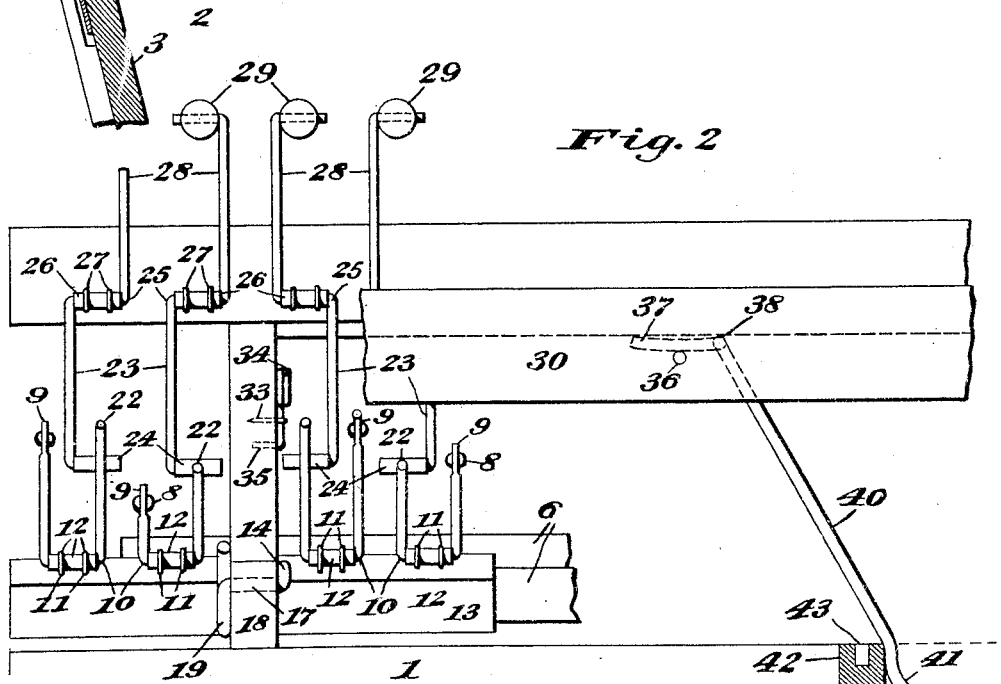
Witnesses
Inventor
John G. B. Astenius
By O. J. Bailey
Attorney No. 789,705. Patented May 16, 1905.

UNITED STATES PATENT OFFICE.

JOHN G. B. ASTENIUS, OF CHICAGO, ILLINOIS.

STOP-ACTION FOR ORGANS.

SPECIFICATION forming part of Letters Patent No. 789,705, dated May 16, 1905.

Application filed March 4, 1904. Serial No. 196,508.

*To all whom it may concern:*

Be it known that I, JOHN G. B. ASTENIUS, a citizen of the United States, residing at Chicago, in the county of Cook and State of Illinois, have invented certain new and useful Improvements in Stop-Actions for Organs; and I do hereby declare the following to be a full, clear, and exact description of the invention, such as will enable others skilled in the art to which it appertains to make and use the same.

This invention relates to certain improvements in organ-actions, and has for its object to provide improved mechanism for controlling the operation of the mutes by which the sounding of the reeds of the several series is governed, the controlling mechanism being of such a nature as to automatically throw the mutes into closed position to prevent the sounding of the reeds when the air-pressure within the organ falls.

The invention consists in certain novel features of the construction, combination, and arrangement of the several parts of the said mute-controlling mechanism whereby certain important advantages are attained and the devices are made simpler, cheaper, and otherwise better adapted and more convenient for use than various other similar mechanisms heretofore employed, all as will be hereinafter fully set forth.

The novel features of the invention will be carefully defined in the claims.

In the accompanying drawings, which serve to illustrate my improvements, Figure 1 is a vertical section taken transversely through the improved organ-action; and Fig. 2 is a partial rear elevation showing the same parts which are seen in Fig. 1, but drawn to a larger scale.

In the views, 1 indicates the wind-chest of the organ, and 2 represents a portion of the air-reservoir having a hinged rear wall 3 in the usual way.

4 represents the ordinary arrangement of the reeds adapted for operation from the wind-chest when opened by actuation of the keys 5, and 6 6 represent the mutes, which may be of the ordinary or any preferred construction, said mutes being, as herein shown, of triangular form in cross-section and being hinged by one of their upper angles, so as to be adapted when lowered, as indicated at *a* in Fig. 1, to prevent the operation of the reeds and when raised, as shown at *b*, to permit the sounding of the reeds when opened by actuation of the keys 5.

Each mute is provided with a coupling member 7, herein shown as made in the form of an ordinary "screw-eye," the threaded portion of which is screwed into the mute 6, as shown in Fig. 1, while the apertured portion thereof is left projecting from the mute to receive an eye on the end of a wire connecting-rod 8, which extends rearward across the action and has at its rear end a similar eye engaged with an arm 9 of a bell-crank or elbow lever 10, held by means of a staple 11 to the upper front portion of a vertically-movable supporting-bar 13, which is carried upon the forward end of a lever 14, the central part 17 of which is bent to produce a fulcrum, which is passed through a pivot-block 18 upon the rear part of the wind-chest, the arrangement being such that the lever is held for pivotal movement upon said block 18. When the lever is moved pivotally in one direction, the bar 13 will be raised, and when said lever is moved in an opposite direction the bar 13 will be lowered.

The rear extremity of the lever is bent upward, as seen at 19, and is adapted to be engaged by an arm or projection 20, extended upward from and movable in unison with the rear wall 3 of the air-reservoir, the inclination of said end 19 of the lever being such that when the said rear wall 3 is moved upon its hinge connection toward the left, as the parts are seen in Fig. 1, said arm 20 will engage said end 19 of the lever and move the lever pivotally to throw the bar 13 upon the forward end of the lever downward, and when said wall 3 is moved in a reverse direction, as shown in Fig. 1, for example, said arm 20 will be withdrawn from beneath the rear end 19 of the lever, so that said lever will be permitted to move in a reverse direction, whereby the bar 13 on the front end thereof will be again elevated to the position shown in Fig. 1. For elevating the bar 13 when arm 20 is disengaged from the lever I provide a spring 21, held upon the wind-chest and engaged beneath the forward end of said bar 13.

To deaden the action of the bell-crank levers 10 10 when pivotally moved, as will be hereinafter explained, I preferably provide a piece or strip 12 of leather, felt, or the like wrapped upon the pivotal portion of the lever and held by the staples 11, and for securing the bar 13 to the forward end 14 of the supporting-lever I provide said end of the lever with a downwardly-bent part 15, engaged in the upper face of the bar, and with a staple 16, driven into the bar over the lever, as shown in Fig. 1.

In the structure shown in the drawings, which is supposed to indicate one side or end of the organ-action, I have illustrated four series of reeds with their accompanying mutes 6 6; but I do not wish to be understood as limiting myself to this number, since it will be evident that any number of mutes desired may be actuated and controlled according to my invention without material departure from the principles and spirit thereof. As shown in Fig. 2, the several levers 10, of which there is of course one for each mute, are pivotally held side by side upon the bar 13, and each lever 10 is provided with an upturned arm 22 in addition to the arm 9, and the arms 22 of the respective levers are adapted to be engaged by projecting portions 24, which may be provided with rollers or wrapped with sheepskin or other deadening material carried upon the lower ends 23 of levers 25, pivotally mounted upon a suitable support above the bar 13. The levers 25 are bent to produce integral fulcrums, as shown in Fig. 2, and said fulcrums are wrapped with deadening material, as indicated at 26, and are held to the supporting means by staples 27. The levers 25 are also provided with upwardly-extended arms 28, which have connection with the inner ends of stops 29 of a well-known kind, said stops being adapted for endwise movement, whereby the levers 25, connected with them, are adapted to be pivotally moved. The arms 22 of the levers 10 are similarly formed and are inclined rearward from the pivotal parts of the levers, as indicated in Fig. 1, and when a stop 29 is drawn out from the organ-case, the corresponding lever 25 is moved to the position shown at c in Fig. 1, whereby the projection 24 at the lower end thereof is brought into engagement with the corresponding lever 10, (supposing the bar 13 to be raised, as seen in said Fig. 1,) whereby the lever 10 is moved pivotally and its arm 9 is drawn rearward in such a way as to raise or lift the mute 6 with which it is connected, so that the corresponding series of reeds may be sounded. When the stop 29 is reversely moved, it will be evident that the lever 25 will be actuated to withdraw its projecting part 24 from engagement with the corresponding lever 10, whereby the mute 6 connected with said lever will be permitted to close by gravity or by the action of the spring commonly provided for this purpose.

When the bar 13 is lowered by the engagement of the arm 20 beneath the rear end portion 19 of the supporting-lever, it is evident that all of the levers 10 carried upon said bar 13 will also be lowered, and their bent ends 22 will therefore be withdrawn from the path of the projections 24 of levers 25, so that when no air is under pressure within the organ the action of the stops will not be communicated to the mutes 6. Also it will be evident that when the air-pressure in the organ falls and the bar 13 is lowered the ends 22 of levers 10 will be withdrawn from engagement with the projections 24 of levers 25, so that either of the mutes which was before raised will also be lowered.

To permit the use of the full organ without manipulation of the stops 29, I provide a bar or part 30, extended lengthwise across the action and normally supported by means of springs 32 at its ends above and out of engagement with the ends 22 of levers 10 on bar 13. The springs 32 have bent ends 31, engaged in the end portions of the part 30, as indicated in Fig. 1, and have their opposite ends provided with coils 34 and with projecting end portions 35, bent at angles and driven into suitable supports, staples being driven into the supports over said ends, as seen in the drawings, to effect the attachment of the springs to their supporting means. By this arrangement the bar or part 30 will be elastically upheld out of position for engagement with the arms 22 of levers 10, as indicated in Figs. 1 and 2; but said bar or part 30 is capable of depression against the tension of springs 32 in such a way that its lower edge will be engaged with the arm 22 of each lever 10 on the bar 13 when said bar is raised, as above explained. When bar 13 is lowered, of course the levers 10 thereon will be dropped, so that no effect is produced by the depression of the bar or part 30; but when said bar is raised it will be evident that the engagement of the part 30 with the arms 22 will act to pivotally move the levers 10 and through their connections with rods 8 will act to raise and open the several mutes 6 6.

For depressing the bar or part 30 I provide a lever 38, held by suitable means, as seen at 39, to a suitable support and having its rear end 37 bent laterally and adapted for engagement upon a pin or lug 36, carried at the central part of the bar 30, while the forward end 40 of said lever 38 is bent downward, as indicated in the drawings, and is adapted for engagement with a knee-swell 42, pivoted in a well-known way at 43, the extremity of the bent end 40 of lever 38 being extended alongside of the knee-swell, as shown at 43, so that when the swell is pivotally moved the lever 38 will be rocked, and its bent rear end will be caused to bear down upon the bar or part 30 to engage it with the arms 22 of levers 10.

In the operation of the device it will be evident that the mutes 6 are automatically closed when the air-pressure within the organ falls, the closing action of said mutes being controlled directly by the fall of air-pressure within the organ irrespective of the operation of the stops or knee-swell, and it will be seen that this result is attained by a structure of extreme simplicity and of a very inexpensive nature, which is also not liable to become deranged or broken when in use.

It will also be obvious from the above description that the device is capable of considerable modification without material departure from the principles and spirit of the invention, and for this reason I do not wish to be understood as limiting myself to the precise form and arrangement of the several parts herein set forth in carrying out my invention in practice.

Having thus described my invention, I claim—

1. In an organ, the combination of mutes, mechanical means for moving the mutes into open or closed position, independently one of the other, an elastically-suspended bar extending above the free ends of all the mute-levers, means for depressing the said bar upon the free ends of the mute-levers to secure full organ and pneumatic means for simultaneously moving said mutes into closed position when the organ is not in use.

2. In an organ, the combination of mutes, an elastically-upheld part connected with each mute and arranged when moved to actuate the mute connected with it, stops having parts for engagement with the elastically-upheld parts for actuation thereof and means controlled by the fall of air-pressure in the organ for depressing the elastically-upheld parts.

3. In an organ, the combination of mutes, an elastically-upheld support, levers mounted on the support and having connection with the respective mutes, other levers having portions for engagement with and adapted to actuate said first-named levers, stops connected with and arranged to actuate the last-named levers, a lever one end of which has connection with said elastically-upheld support and an arm carried on a movable part of the air-reservoir and arranged to actuate said last-named lever.

4. In an organ, the combination of mutes, a pivoted lever, a support carried thereon, means for pressing the support elastically upward, levers pivoted on the support and each having two arms one of which is connected to one of the respective mutes and the other of which is inclined rearward, a plurality of stops, other levers actuated from the stops and having parts adapted to engage and move the rearwardly-inclined arms of the first-named levers and means actuated by variations in air-pressure within the organ for depressing the support.

5. In an organ, the combination of mutes, an elastically-upheld support, levers pivoted on the support and each having two arms one of which is rearwardly inclined and the other of which is connected with one of the respective mutes, a plurality of stops, other levers actuated from the stops and having parts for engagement with the rearwardly-inclined arms of the first-named levers to move the same, a part extended across and above the rearwardly-inclined arms of the first-named levers and having elastic supporting means at its ends, a lever pivoted at its central part and having an arm engaged with said part to move the same down in engagement with the inclined arms of the first-named levers, a knee-swell arranged to move said lever and means actuated by variations in air-pressure within the organ for depressing said support.

In testimony whereof I affix my signature in presence of two witnesses.

JOHN G. B. ASTENIUS.

Witnesses:
DAVID N. C. ASTENIUS,
J. S. WAHLMAN.